July 21, 1964 H. A. OHLGREN ETAL 3,141,739
GAS PURIFICATION
Filed May 14, 1959 3 Sheets-Sheet 1

INVENTOR.
HAROLD A. OHLGREN
JOHN G. LEWIS
BY
FINN G. OLSEN
ATTORNEY

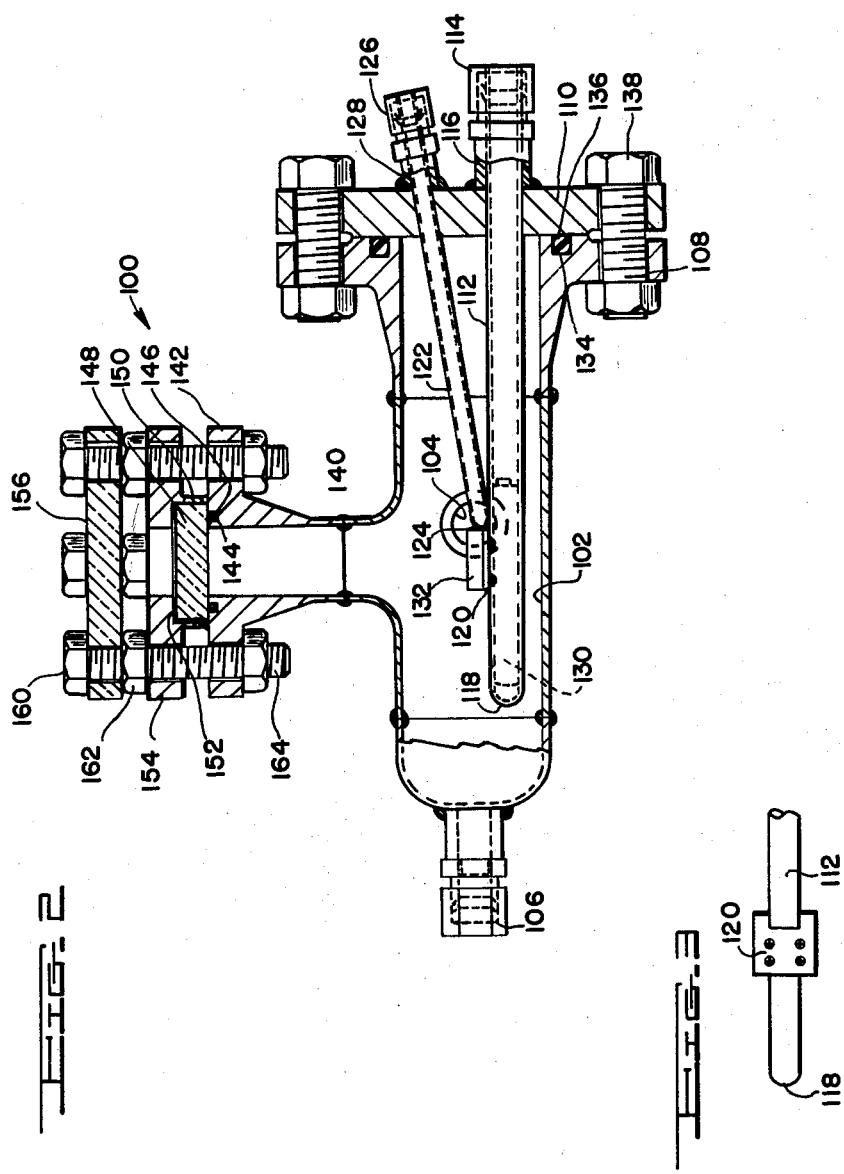

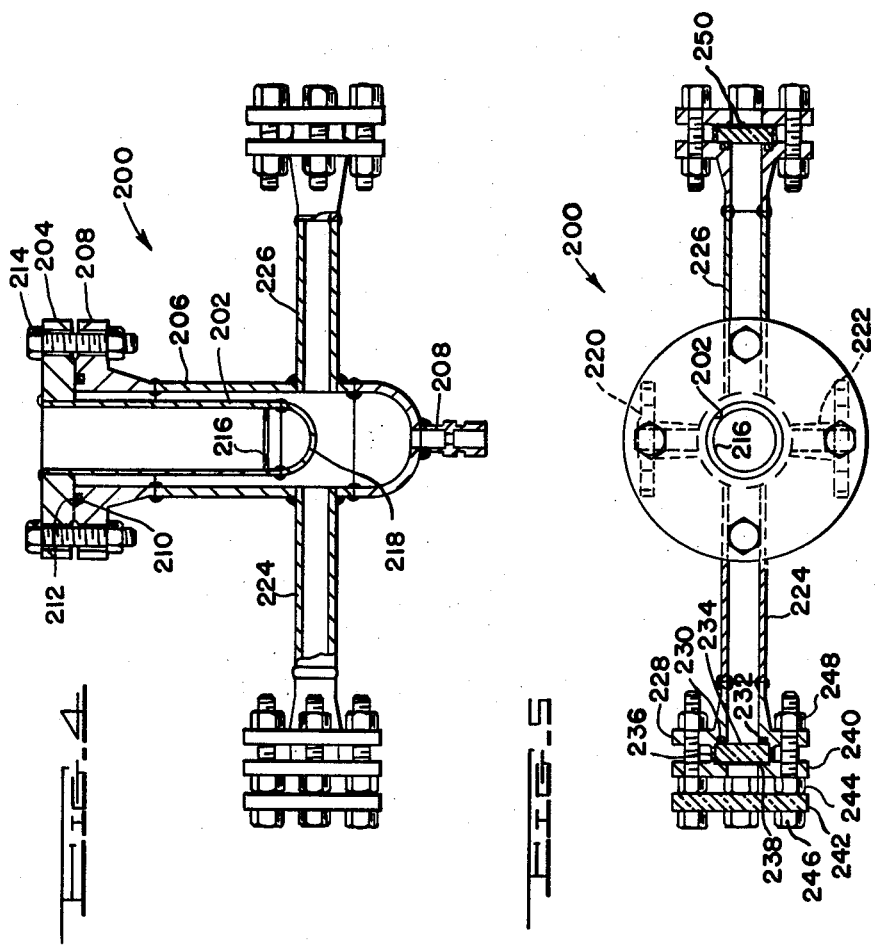

United States Patent Office 3,141,739
Patented July 21, 1964

---

3,141,739
GAS PURIFICATION
Harold A. Ohlgren and John G. Lewis, Ann Arbor, Mich., assignors, by mesne assignments, to Nuclear Technical Services Corporation, Ann Arbor, Mich., a corporation of Michigan
Filed May 14, 1959, Ser. No. 813,228
2 Claims. (Cl. 23—209)

This invention relates to the purification of hydrogen, nitrogen, and the noble gases. More particularly, the present invention is concerned with a process of and an apparatus for removing impurities from argon and helium and with a new cold trap and polished metal inspection unit to verify the removal of the impurities.

In recent years there has been an increasing need for purifying gases, particularly noble gases such as helium and argon and especially as employed in high temperature technology. The use of such gases has grown greatly during the past few years to provide gaseous blankets over hot metal. The noble gases permit such operations at atmospheric pressure rather than high vacuum, thus suppressing volatization of metals and allowing convenient manipulation of work, as by rubber gloves.

Commercial suppliers provide gas of high purity. However, cost is a factor, and handling from suppliers to point of use may allow the addition of impurities as by traces of other gases in transport cylinders, connecting piping, and the like. Similarly, the use of the gases in industrial operations usually results in contamination with oils, grease, water, oxygen, nitrogen, carbon monoxide and the like. The intrinsic cost of noble gases is relatively high, making the recycling of such gases from point of exit and return to point of use a necessary step. As an example, helium or argon costs about seven to ten cents per standard cubic foot and therefore, there is a real need for a purification process costing less than one cent per cubic foot.

Government directives for the control of helium usage have stimulated incentives for the saving and re-use of helium which is a irreplaceable natural resource of very limited extent. Argon can be used to replace helium in certain applications, but the two gases have significantly different properties rendering interchange difficult. Generally, argon is also somewhat more expensive than helium.

A supply of helium or argon containing 0.1% (1000 parts per million) of impurities is quite pure by classical chemical standards. Many workers believe that such levels of purity are sufficient or believe that greater purity is not possible. However, even 0.1% of impurities is sufficient to cause gross difficulties in many high temperature metallurgical operations. In addition, many metals react continuously and nearly completely with traces of impurities much less than 0.1% and remove such impurities from a noble gas atmosphere. Therefore, continuous analysis of such gases to determine impurity level can be completely misleading if there are any leaks of impurities into the system. A low analysis for impurities may indicate a balance between leakage rate of impurities into the system and the rate of absorption of such impurities by the work.

It is, therefore, an object of the present invention to provide a method of an apparatus for the purification of the noble gases, nitrogen, and hydrogen.

It is a further object of the present invention to provide a method of and an apparatus for reducing the impurities in noble gases to less than about 10 parts per million and as low as one part per million.

It is also an object of the present invention to provide at a reasonable cost an integrated gas purification system requiring only utility, gas feed, and gas discharge lines and requiring a minimum of attention and maintenance.

It is still a further object of the present invention to provide a purification process which does not require the addition of subsidiary gases which will themselves become impurities if not completely removed.

It is also an object of the present invention to provide for the visual inspection of the degree of purification following each filtering, absorbing, drying, or reaction unit.

It is still another object of the present invention to provide an improved inspection unit for inspecting a polished sample of a reactive metal, such as uranium, which sample will provide rapid discoloration and thereby an indication of the presence of impurities in a gas in which said sample is located.

It is still another object of the present invention to provide an improved inspection unit of the foregoing character wherein said polished sample is heated to and maintained at a predetermined temperature in said inspection unit and wherein said polished metal is heated from within the inspection unit thereby avoiding undesirable effects inherent in units employing external heating sources.

It is still another object of the present invention to provide an improved inspection unit of the foregoing character wherein the heater and associated temperature indicating means may be removed from the inspection unit without breaking the gas-tight seal to the inspection unit.

It is still another object of the present invention to provide an improved inspection unit of the foregoing character wherein access to the unit for removing the polished sample is provided through a normally hermetically sealed closure member which is characterized by its effective sealing properties and the ease with which it can be opened and restored in place.

It is still another object of the present invention to provide an improved inspection unit of the foregoing character, which is constructed and arranged with a hermetically sealed sight glass positioned relatively close to the polished sample for observing the same and which glass is substantially out of heat transfer relationship with respect thereto so that the seal for the glass will not be harmfully affected by heat given off by said polished sample or the heating element associated therewith.

It is still another object of the present invention to provide an inspection unit adapted to indicate the presence of impurities remaining in a gas stream after successive stages of purification by allowing such impurities to be seen frozen out on a cold surface.

It is still another object of the present invention to provide an inspection unit of the foregoing character which is a simple, inexpensive, easily constructed device, and one requiring a minimum of attention and requiring no automatic control devices.

It is still another object of the present invention to provide an inspection unit adapted to be used in a gas purification system, and inspection unit being leak-tight to the gas under pressure and at approximately one micron absolute pressure while allowing safe visual inspection and illumination of the cold surface over which gas may be flowing.

Other objects of this invention will appear in the following description and appended claims, reference being had to the accompanying drawings forming a part of this specification wherein like reference characters designate corresponding parts in the several views.

In the drawings:

FIGURE 2 is a side elevation of a polished metal inspection unit with a major portion removed to provide a vertical section through the longitudinal axis of the unit;

FIGURE 3 is a fragmentary top plan view of a portion of the unit illustrated in FIGURE 2;

FIGURE 4 is a front elevation of cold trap with central portions removed to provide a vertical section through the longitudinal axis of the cold trap; and FIGURE 5 is a top plan view with portions in section of the cold trap illustrated in FIGURE 4.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Figure 1:
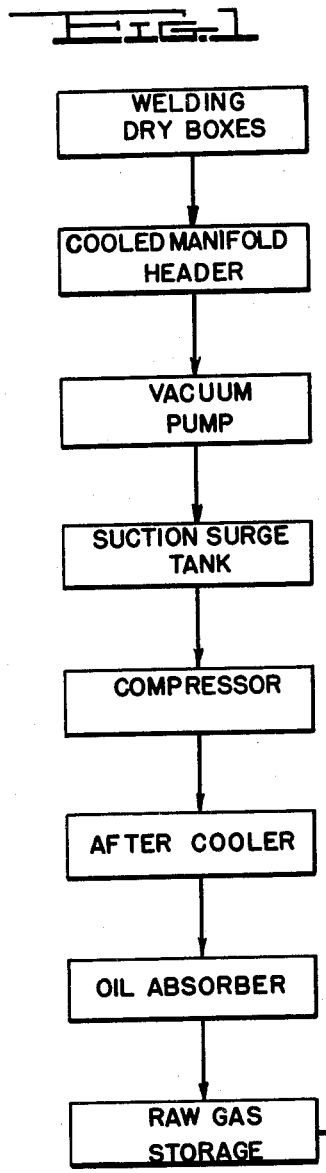
FIGURE 1 is a flow diagram illustrating schematically a process for purifying helium, which process embodies one form of the present invention.
Figure 1:
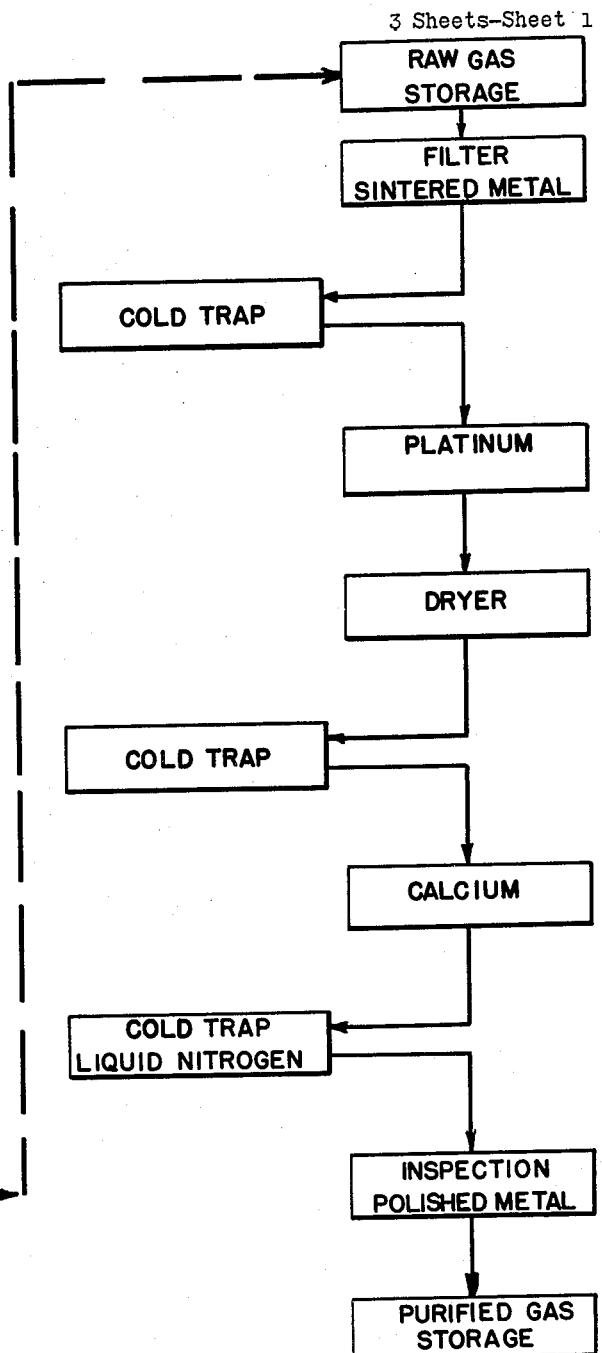

One embodiment of the purification system will be described by reference to the accompanying FIGURE 1, assuming helium to be the gas involved and that the gas has been used in conjunction with welding dry box operations.

Helium gas which has become contaminated by use in the welding dry boxes is drawn through a water-cooled manifold by a vacuum pump. The water cooled manifold is designed to reduce the temperature of the helium to at least 200° F. and preferably to about 100° F.

The gas passes through the vacuum pump to a suction surge tank which provides a balance for the pressures between the vacuum pump and a compressor which follows the surge tank. Such pressure balance is normally required because of the variations in pressure on the upstream side of the pump.

The surge tank may be constructed of carbon or stainless steels. Immediately after fabrication the tank is carefully cleaned and kept dry by the use of desiccants until it is installed in the apparatus of the invention.

The helium gas leaves the surge tank and passes into a compressor which compresses the gas from a gauge pressure of about zero to about 125 pounds per square inch gauge pressure or about 10 atmospheres absolute. During this operation the temperature of the gas may rise to as high as 500° F. The helium is then passed through an after-cooler to reduce the temperature to about 100° F.

The helium then passes through an oil absorber which absorbs substantially all the oils picked up in the vacuum pump and compressor but leaves hydrocarbon impurities at approximately the concentration of the original gas as it left the welding dry boxes.

The helium is then passed into a raw gas storage tank from which it passes into a purification cycle. When the purification process is started up for the first time, or following an extended period of stoppage the system may be evacuated and flushed with gas from the raw gas storage tank.

In the purification cycle the helium is first passed through a sintered metal filter, preferably a stainless steel filter, to remove all oil droplets, grease, and any particulate matter. After leaving the filter the gas may be passed through one of the cold traps of the invention, the cold trap being cooled with Dry Ice and acetone, for example, in order to detect traces of oil film.

The helium is then passed over a platinum, palladium or other suitable catalyst at about 300° F. to provide for the combining of hydrogen and oxygen to form water and to provide for the combining of carbon monoxide and oxygen to form carbon dioxide. Alternatively and prior to contact with the platinum, etc. the hydrocarbons may be cracked in the presence of suitable catalysts, the carbon being retained in the catalyst bed and the hydrogen and various carbon oxides joining the gas stream for contact with the platinum catalyst. The gas, preferably cooled to below 100° F., is then passed through a molecular sieve-type dryer to remove the water to a dewpoint of about −90° F. and to remove a major proportion of carbon dioxide. A second cold trap inspection may then be made for an accurate determination of the dewpoint.

The final purification step and one which is of unique importance to the invention involves the passing of the helium over a heated bed of solid calcium with a controlled temperature gradient of about 800°–1300° F.

Calcium is non-toxic, inexpensive, and does not react with impurities sufficiently fast to overheat. Further calcium forms a stable nitride. The gas may be contacted with calcium at about 1300° F. and then contacted with calcium at reduced temperatures down to about 800° F. However, a gradient of exceptional efficiency involves maintaining the calcium bed at an inlet temperature of about 800° F., a maximum temperature of about 1200°–1350° F. and an exit temperature of about 800° F. Such a temperature gradient provides a controlled reactivity of impurities with calcium with maximum absorption of such impurities by the calcium.

As an alternative to calcium or in conjunction with calcium, titanium can be used at a temperature of about 1400°–1500° F. When these metals are used in series the excellent absorbing powers of titanium for hydrogen impurities can be used to great advantage. When titanium is used alone the system is especially suitable for the purification of hydrogen.

When it is desired to purify hydrogen the gas is best contacted with a bed of chromium at temperatures sufficiently high to effect the formation of chromium nitride (with nitrogen), chromium oxide (with oxygen), and chromium carbide (with carbon monoxide and carbon dioxide). The preferred temperature range is 500°–700° F. Chromium offers many advantages when used in series with calcium. In this case chromium is used ahead of the calcium to treat noble gases heavily contaminated with nitrogen.

Chromium can be used advantageously in parallel beds. Thus, when one bed has reached its limit of absorption the gas can be switched to the second bed. Meanwhile the first bed can be regenerated by heating to about 1000°–1300° F. and evacuated to remove nitrogen.

Although calcium can be used alone in the final purification step of a noble gas we have discovered that a minor proportion, for example, one percent; of chromium, manganese, molybdenum, or mixtures thereof exert a catalytic effect with respect to the absorption of impurities by calcium and therefore such compositions with calcium are especially valuable in the practice of our invention. Thus about one percent total of metals selected from the group consisting of chromium, manganese, and molybdenum may be added to calcium and the mixture tumbled. It appears that some intermetallic compounds or interdiffused alloys of the calcium with these metals result during the heating required for purification.

Similarly, a bed of successive layers of manganese, chromium, titanium, and calcium heated to about 700° F. is an especially valuable alternative for the calcium bed. Such a bed can be regenerated by heating to about 1200° F. under reduced pressure. Where nitrogen is to be purified such a bed should comprise manganese and include tungsten as a follow-up to manganese for best results.

In those cases where the gas to be purified contains gross impurities; 5–50 percent, for example; the process must be modified in order to remove a substantial proportion of the impurities before treatment with the calcium bed of the invention.

Where the gas containing gross impurities is a noble gas, the gas is filtered, subjected to a catalyst such as platinum and the like to combine equivalent proportions of hydrogen and oxygen, and dried in accordance with the procedures outlined above. The gas is then passed over a bed of manganese at a temperature of about 400°–500° F. in order to remove substantially all the remaining oxygen in the gas. The gas is then passed through a bed of chromium at a temperature of about 500° F. to remove the nitrogen, the remaining oxygen, some carbon monoxide and some carbon dioxide. The gas is then contacted with the calcium bed of the invention for purposes of final purification.

The manganese as well as the chromium, may be used in parallel beds in order that one bed may serve in the purification cycle while the other is being regenerated. The manganese bed may be regenerated by heating it several hundred degrees under a reduced pressure.

Where the gas containing gross impurities is hydrogen the gas may be filtered, contacted with a catalyst such as platinum and the like, dried, contacted with chromium at a temperature of about 500° F. to remove nitrogen as well as some carbon monoxide and carbon dioxide, and then contacted with titanium at about 1200°–1400° F.

Where the gas containing gross impurities is nitrogen the gas may be filtered, contacted with a catalyst such as platinum and the like, dried, contacted with manganese at about 400°–500° F. and then contacted with chromium at about 1300°–1500° F. Under these conditions the residual oxygen, carbon monoxide, and carbon dioxide reacts with the chrome. Where the nitrogen is nearly pure the step of contacting the gas with manganese can be omitted.

Although the process of the invention is particularly applicable to argon and helium, it will be apparent that it can be used in the purification of other noble gases; neon, krypton, xenon and radon. Also, with slight modification it can be of great value in the purification of nitrogen and hydrogen. Each of the foregoing gases finds use as a gas blanket over hot reactive metals. The noble gases, in particular, find use in the technology of uranium, thorium, titanium, zirconium, tantalum, tungsten and niobium. Examples of operations requiring such a gas blanket are molten metal "loop" tests of nuclear fuels systems, brazing, welding, castings, annealing, quenching, chemical reactions, and the like.

Although the process of the invention can be used with advantage with relatively impure noble gas, it finds its greatest utility where other purification systems leave off. Thus, the process is most advantageous when gas containing about 1000 or less parts per million impurities is supplied to it.

*Example I*

The following is an average typical example of the removal of impurities of argon and is submitted merely to illustrate an embodiment of the invention. A typical analysis of such a gas is as follows:

|  | Parts per million |
| --- | --- |
| Nitrogen | 600 |
| Oxygen | 150 |
| Hydrogen | 50 |
| Carbon monoxide | 50 |
| Carbon dioxide | 50 |
| Water | 100 |
| Argon | Balance |

Argon, containing the above impurities and some dust, was drawn from a welding dry box at a rate of 10 cubic feet per minute and at a temperature of 300° F. The gas was cooled to less than 200° F. by passing through a water cooled manifold header. After passing through the vacuum pump and surge tank, the gas had a temperature of 150° F. at substantially atmospheric pressure. The compressor put the gas under a pressure of about 10 atmospheres absolute and a temperature of about 500° F.

The gas was cooled in an after-cooler to a temperature of about 100°–125° F. and was found to have picked up about 1000 parts per million oil vapor and about 2000 parts per million oil droplets from the pump and compressor. A filter-oil absorbing unit removed the oil droplets and substantially all the oil vapor.

Following the raw gas storage tank the gas was passed through a sintered metal filter to assure the removal of all droplets and solids. The gas was then passed through a cold trap of the invention for purposes of noting any oil film which might form.

Following effecting cracking, oxidation of hydrogen, and oxidation of carbon monoxide, the gas analysed 600 parts per million nitrogen, 20 parts per million oxygen, 20 parts per million hydrogen, 550 parts per million carbon monoxide, 350 parts per million carbon dioxide, and 1030 parts per million water.

The drying step reduced the carbon dioxide to 100 parts per million and the water to 5 parts per million.

The resulting gas was then passed over a calcium bed with a temperature gradient of 800° F. to 1200° F. and then back to 800° F. The analysis of the gas was then 1 or 2 parts per million of each of the following: nitrogen, oxygen, hydrogen, carbon monoxide, and carbon dioxide, making a total of 8 parts per million impurities.

*Example 2*

Example 1 was repeated except that a bed of chromium at about 600° F. and a bed of titanium at about 1200° F. preceded the calcium bed. Results were essentially the same except that a substantial portion of the nitrogen was removed by the chromium and substantially all the remaining nitrogen and the hydrogen were removed by the titanium. In this connection it was found that a bed of manganese to remove oxygen prior to the chromium or calcium treatment also increases the efficiency of the unit. In this connection also it was found that zirconium, niobium may be substituted for the titanium with appropriate adjustment of temperature.

*Example 3*

The removal of argon from air is an example of the purification of argon in the presence of gross impurities. The air was filtered, dried, and then passed over cyclic manganese beds at a temperature of 450° F. for removal of nearly all the oxygen. The gas was then passed over cyclic chromium beds at a temperature of about 600° F. for the removal of substantially all the nitrogen. The residual gas, practically pure argon was then passed over the catalysed calcium beds of the invention wherein the residual impurities were removed to yield a highly purified argon. In this example practically pure nitrogen was removered during renegeneration of the chromium beds.

The above example was repeated using the by-product stream from a liquid oxygen plant. A welding grade argon was produced.

*Example 4*

Cracked ammonia containing 75 mol percent hydrogen, 25 mol percent nitrogen, and small amounts of ammonia was filtered and then dried in a molecular sieve drier. Most of the water and ammonia was removed. The mixed hydrogen and nitrogen was then passed through cycling chromium beds held at 500° F. to remove the nitrogen. The chromium was subsequently heated to 1200° F. under vacuum to recover the nitrogen. The hydrogen resulting from the chromium bed treatment was found to contain a few hundred parts per million impurities and was contacted with titanium at 1300° F. which reduced the impurities to a few parts per million. The example was repeated using molybdenum and tungsten respectively in place of chromium for similar results.

Referring next to FIGURES 2 and 3 of the drawings, a more detailed description will be made of one embodiment of an inspection unit that is used in the gas purification system described herein. The inspection unit will be referred to generally by the reference number 100. The inspection unit 100 includes a compartment 102 having a gas inlet duct 104 and a gas outlet duct 106 both of which are adapted to be connected into the gas purification system in such a manner as to provide hermetically sealed joints between the remainder of the system and the inspection unit 100. One end of the compartment 102 has an opening defined by the annular flange or surface 108, and this opening is normally closed by a closure member 110 which also has an annular flange-like surface around its inner face.

Mounted on the closure member 110 is a first tube 112 which has at its outer end a fitting 114 for assuring a hermetically sealed joint between the collar 116 and the tube 112. The inner end of the tube 112 is closed as can be seen at 118, and fastened to the upper, outer surface of the tube 112 is a pad 120.

Also mounted in the enclosure member 110 is a second tube 122 which is in the same vertical plane as the first tube 112 and is inclined with respect thereto so that the inner end 124 is directly connected to the pad 120. The outer end of the tube 122 has a fitting 126 thereon for effecting a hermetically sealed joint between the second tube 122 and the collar 128.

The first tube 112 is adapted normaly to carry therein a cartridge electrical heater or heating element such as is shown at 130, and the pad 120 is adapted to carry thereon a polished metal sample such as uranium, such sample being identified by the reference number 132. By virtue of this arrangement, the heating element 130 may be used to heat the sample 132 to a desired temperature and to maintain the same at this temperature, for reasons to be described more fully hereinafter.

The second tube 122 is adapted to carry therein a thermocouple, not shown, or a similar temperature sensing device for indicating the temperature of the sample 132.

In order to assure that a hermetically sealed joint is provided between the closure member 110 and the side walls of the compartment 102, the annular flange 108 is provided on its outer surface with an annular groove 134 within which is carried, in a state of compression, a rubber-like O-ring 136, the latter normally projecting outwardly beyond the outer surface of the flange 108 when the cover member 110 is removed. When the cover member 110 is inserted in place the rubber-like O-ring 136 will be compressed tightly in the annular groove 134 and will maintain a hermetically sealed connection with the surface of the cover member 110. The annular flange 108 and the cover member 110 are secured tightly together by means of a plurality of bolts and nuts 138. Thus, it can be seen, that the cover member 110, the integrally attached first and second tubes 112 and 122, respectively, and the specimen 132 which is supported on the pad 120, can be withdrawn as a unit for the purpose of removing and polishing the upper surface of the sample 132 when the latter becomes discolored. Thereafter, the complete assembly of parts can be secured in place again closing the open end of the compartment 102, thus, a hermetically sealed joint at the open end is always assured when the cover member 110 is in place so that no impurities can enter the compartment 102.

The compartment 102 also has a tubular projection 140 formed in its side wall and in alignment so that the specimen 132 can be observed through the open end of the tubular projection 140. The tubular projection 140 has an annular flange 142 at its outer end and the outer surface of the flange 142 has an annular groove 144 therein in which is positioned, in a state of compression, a rubber-like O-ring 146. Seated on the O-ring 146 and covering the open end of the tubular projection 140 is a sight glass or lens 148. Surrounding the sight glass 148 is a rigid annular collar 150. The sight glass 148 has a rubber-like washer 152 seated on the outer surface and an annular flange 154 is seated on the washer 152 and the annular collar 150. Spaced outwardly of the annular flange 154 is a tough transparent material or protective flat glass 156; and the flat glass 156, the annular flange 154 and the annular flange 142 are secured together by means of the plurality of bolts 160 and associated nuts 162 and 164. It will be observed that the nuts 162 and 164 are effective for clamping the annular flanges 154 and 142 together and the nut 162 serves as a spacer element for maintaining the flat glass 156 in spaced relation to the annular flange 154. This spaced relationship is effective in providing air circulation over the sight glass 148 to prevent condensation and the like, from forming on the outer surface of the sight glass, and to provide cooling to prevent over-heating of the sight glass. It also serves to allow relatively harmless escape of gas and fragments of the sight glass in the event the latter should accidentally break.

Thus, it can be seen that the sight glass 148 is positioned relatively close to the sample 132 to permit visual observation of the same, and at the same time, the sight glass 148 is mounted in place so as to provide an effective hermetic seal to prevent leakage of impurities from the atmosphere to the interior of the compartment 102 and the escape of valuable gases from compartment 102. The sight glass is supported in place so that it will not be subjected to stresses resulting from bolting the flanges 142 and 154 together, and at the same time, the rubber-like O-ring 144 will provide an effective hermetic seal for the sight glass 148. Flanges 142 and 154 are spaced by rigid annular collar 150 so that O-ring 144 may be compressed sufficiently to seal the sight glass to flange 142, but the flanges cannot be compressed enough to break the sight glass 148.

Preferably, one may look through the sight glass 148 by means of an optical device having a 10–20 power magnification. The sight glass is positioned about five and one half inches from the polished surface of sample 132. In the normal operation of the inspection unit 100 in the gas purification system, the polished metal sample 132 will be heated to approximately 1000° F. The inspection unit 100 is constructed so that the sample 132 will be supported substantially out of heat transfer relationship with respect to the compartment 102 as well as with respect to the sight glass 148. Furthermore, by virtue of the relatively long, narrow, tubular projection on which the sight glass 148 is mounted, the sight glass 148 will be further protected from heat radiated from the sample 132, and the shape and configuration of the tubular projection will in effect tend to keep the sight glass 148 at somewhat near the surrounding atmospheric temperature.

It is also to be observed that all the joints in the compartment 102 are welded joints and the wall portions are preferably made of forged or wrought metal which give better assurance of leak tightness than does cast metal. The O-ring seals 146 and 136 are of such dimensions with respect to the annular grooves 144 and 134 so as to confine the O-rings closely both internally and externally. This permits effective seals under both vacuum and pressure. Thus, the entire unit is assured of being a hermetically sealed compartment with the exception of the gas that can flow therethrough via the inlet duct 104 and the outlet duct 106.

In the normal operation of the present device, the polished sample 132 will be mounted in position shown in the drawings and will be heated to approximately 1000° F. as was previously indicated, by means of the electric heating element 130. The temperature of the sample can be observed by means of the thermocouple, not shown, within the tube 122. Under these operating conditions gas will be flowing through the compartment 102 from the inlet duct 104 to the outlet duct 106. In the event there are impurities in the gas flowing therethrough, this will be evidenced by discoloration of the polished surface of the sample 132, and such discoloration can be detected by visual observation through the sight glass 148.

From the foregoing it will be observed that the hottest region within the compartment 102 is within the metal supported on the side away from the sight glass 148. In this manner the volume or area of hot surface is limited essentially to the hot polished metal itself. Under these conditions, low power input is required to maintain temperature and the radiated and convected thermal energy is minimized. Also, most of the heat goes to the walls of the compartment which offer a large surface for convection and radiation, and a very small amount of the heat from the sample 132 will be absorbed by the sight glass 148.

Another feature of this design is that the heating element 130 can be removed from the unit at any time. It is not attached to the heated portion, but only inserted into it. Removing the heater element 130 does not require breaking the gas tight seal to the unit, since the heater is placed in a gas tight well, open to the atmosphere at one end. The same considerations apply to the temperature measuring device. Also, as previously described, the O-ring seal at the closure member 136 permits the closure member to be removed readily for examination of the polished metal sample 132 and to repolish the sample if desired or necessary. The O-ring seal is broken readily and remade with no difficulty to obtain the desired standards of leak tightness.

Another feature of the use of the heating arrangement described is that the heating element being an internal device requires the minimum amount of power input, thereby minimizing the heating of the O-ring seal in the unit, which prolongs the service life of such O-ring seals. Also, the cross-sectional areas of the tubes 112 and 122 are sufficiently small compared with the length of such tubes so as to minimize the thermal conduction to the closure member 110, thereby further protecting the O-ring 136 from the undesirable effects of over-heating. In this respect, it will be noted that the closure member 110 has a relatively large area so as to facilitate discharging to the atmosphere any heat which might be transferred thereto from the tubes 112 and 122 or the sample 132.

Referring next to FIGURES 4 and 5 of the drawing, the inspection unit or cold trap 200 will be described in greater detail. The cold trap 200 is used to remove condensable materials or to provide an indication of their presence in the gas stream of the gas purifier system, previously described. This is accomplished by causing gas to flow over a cold surface so that the condensables are frozen or condensed from the gas stream. In the present cold trap design, a "cold finger" is used, this being the hollow cylindrical vessel 202 which is closed at the bottom and open at the top. The vessel 202 is welded at its upper end to the annular flange 204 which forms a closure member for the open end of the compartment 206. The latter is shown in the form of an upright cylindrical body portion which is closed at the bottom except for a small drainage outlet 208 which is adapted to have a valve unit, not shown, or other drainage means connected thereto and the bottom of the compartment will normally be closed.

The upper end of the compartment 206 has an annular flange 208 with an opening therein through which the vessel 202 projects to the lower regions of the compartment 206. As can be seen in the drawings, the vessel 202 is in spaced relation to the side walls of the compartment 206 so as to be out of heat transfer relationship with respect thereto. The annular flange 204 together with the vessel 202 forms in effect a closure member for the open end of the compartment 206.

In order to provide a hermetically sealed joint between the upper end of the compartment 206 and the closure member 204, the annular flange 208 has an annular groove 210 formed therein within which is carried a rubber-like O-ring 212 which is held therein in a state of compression, and which normally projects above the upper surface of the annular flange 208 when the annular member 204 is removed therefrom, and which is held in tight compression against the annular flange 204 when the latter is seated on the upper end of the compartment 206 and is drawn tightly there against by means of the plurality of bolts and nuts 214.

The vessel 202 has near its lower portion a small ring 216 which serves to caution the user to limit the amount of coolant that can be added to the interior of the vessel so as to minimize the danger of cooling the O-ring 212 excessively, thus allowing it to remain flexible enough to retain its sealing properties.

The exterior lower portion of the vessel 202 is polished generally in the area 218 so as to show more effectively when condensables are frozen or condensed thereon from the gas stream. The gas stream normally will flow directly around the outer portion of the vessel 202 by virtue of the fact that the gas inlet duct 220 and the gas outlet duct 222 are aligned with the lower portion of the vessel 202. Also aligned with the lower portion of the vessel 202 are the two tubular projections 224 and 226 and which serve, respectively, for sighting and illuminating the polished portion 218 of the vessel 202.

Referring first to the tubular projection 224, a brief description will be given of the sight glass as it is there constructed. The outer end of the tubular projection 224 has a laterally outwardly extending annular flange 228 which has in its outer surface an annular groove 230. The latter carries therein a rubber-like O-ring 232 which is in a state of compression therein and on which is mounted a sight glass 234. The latter normally will be positioned about five and one half inches from the polished surface 218 of the vessel 202, and this distance will permit viewing with an optical device having a 10–20 power magnification and will keep the sight glass free from frosting effects. Positioned around the circumference of the sight glass 234 is an annular collar 236. A rubber-like washer 238 is seated on the outer surface of the lens 234 and an annular flange 240 is seated on the annular collar 236 and the rubber-like washer 238. Spaced outwardly from the annular flange 240 is a protective flat glass or shatter-proof transparent disk 242 which is maintained in spaced relationship by means of a pluarlity of nuts 244 and a plurality of bolts 246 which extend through the flat glass 242, the nuts 244, the annular flange 240 and the annular flange 228 and are held in this position by the plurality of nuts 248 threadedly connected to the bolts 246.

By virtue of the construction described, the sight glass is held in place in hermetically sealed relationship with respect to the tubular projection 224 to prevent impurities from leaking into or out of the gas purifier system. The sight glass 234 is also positioned out of heat transfer relationship with respect to the lower portion of the vessel 202, thereby minimizing the danger of cooling the O-ring 230 excessively so as to allow it to remain flexible to maintain its sealing properties. Also, condensation of atmospheric moisture on glass 234 will be minimized so that the view through the sight glass will not be obscured.

The construction and mounting arrangement for the sight glass 234 is also such that it will prevent danger of shattering the sight glass during the assembly operation when the bolts 246 are drawn tightly together with the nuts 248. This is accomplished by means of the annular collar 236 which limits the extent to which the annular collar 240 can be drawn toward the annular collar 228 and also by virtue of the rubber-like washer 238 which prevents direct contact of the metal parts with the sight glass 234.

The mounting of the light glass on the end of the tubular projection 226 will not be described in detail, because it is constructed in essentially the same manner as the sight glass previously described. The only difference that exists with respect to the light glass 250 is that there is no protective flat glass mounted in spaced relation thereto. However, in other respects the light glass 250 is mounted in hermetically sealed relation with respect to the tubular projection 226, in the same manner that the sight glass 234 is mounted in hermetically sealed relation with respect to the tubular projection 224.

In the present embodiment of the invention, the illumination and sight glasses are shown as being opposite each other, but it will be understood that other angular relations can be used, and in some instances, may be preferable in order to give better illumination of the polished exterior of the vessel 218. It is also to be understood that the bottom connection 208 in the compartment 206 is provided to permit the drainage of any large quantities of condensed material, but it may also be used to allow connection of a supplementary analytical device, if this should be desired.

In the normal operation of the present invention, the gas stream will flow continuously across the bottom portion of the vessel 202, and as previously described, this can be observed by means of the illumination and sight glasses 250 and 234. When the lower portion of the vessel 202 has become coated with condensables from the gas stream, the vessel 202 can be removed and wiped clean mereby by raising the annular flange 204. At all other times, the compartment 206 will be maintained in a closed hermetically sealed relation except for the normal communication it has with the rest of the gas purifier system. The coolant can always be added through the open top of the vessel 202 so as not to affect the hermetically sealed compartment 206.

Having thus described our invention, we claim:

1. The process of purifying a noble gas, said process comprising compressing and cooling said gas; removing solid, liquid, and hydrocarbon constituents from said gas; contacting the gas with a catalyst for the purpose of effecting combination of hydrogen and oxygen impurities to form water and effecting combination of carbon monoxide and oxygen impurities to form carbon dioxide; drying and absorbing carbon dioxide from said gas; contacting said gas with manganese at about 400–500° F.; contacting said gas with chromium at about 500°–700° F.; contacting said gas with titanium at about 1200° F.; contacting said gas with calcium at about 800° F.; contacting said gas with calcium at about 1200° F.; contacting said gas with calcium at about 800° F.; and cooling said gas, at a plurality of points in said process, to a temperature sufficient to condense water and carbon dioxide in said gas.

2. In the purification of a noble gas, the steps comprising filtering the gas to remove oil, grease and particulate matter, contacting the gas with a catalyst selected from the group consisting of platinum and palladium to provide for the combining of hydrogen and oxygen in the gas to form water and to provide for the combining of carbon monoxide and oxygen to form carbon dioxide, drying the gas over a bed of manganese at a temperature of about 400° F. to 500° F. to remove oxygen in the gas, passing the dried gas through a bed of chromium at a temperature of about 500° F. to remove nitrogen, oxygen, carbon monoxide and carbon dioxide, and thereafter bringing the gas into contact with a heated calcium bed having different portions thereof at different temperatures in the range between about 800° F. and 1350° F.

References Cited in the file of this patent

UNITED STATES PATENTS

| | | |
|---|---|---|
| 1,478,036 | Jones | Dec. 18, 1923 |
| 1,555,570 | Haynes | Sept. 29, 1925 |
| 1,900,882 | Lusby | Mar. 7, 1933 |
| 1,955,328 | Frey | Apr. 17, 1934 |
| 2,204,501 | Krauss | June 11, 1940 |
| 2,242,101 | Atlee | May 13, 1941 |
| 2,410,102 | Paterson | Oct. 29, 1946 |
| 2,739,132 | Riedl | Mar. 20, 1956 |
| 2,762,449 | Sweeney | Sept. 11, 1956 |
| 2,800,974 | Gilman et al. | July 30, 1957 |
| 2,808,423 | Bartlett | Oct. 1, 1957 |
| 2,824,789 | Borkenstein | Feb. 25, 1958 |
| 2,866,691 | Feichtinger | Dec. 30, 1958 |
| 2,874,030 | Dennis | Feb. 17, 1959 |

OTHER REFERENCES

Gibbs et al. in "Industrial and Engineering Chemistry," volume 48, No. 2, pages 289 to 296, February 1956.